Dec. 23, 1958   F. K. SHALLENBERGER ET AL   2,865,066
SHELL MOLDING APPARATUS
Filed March 2, 1953   4 Sheets-Sheet 1
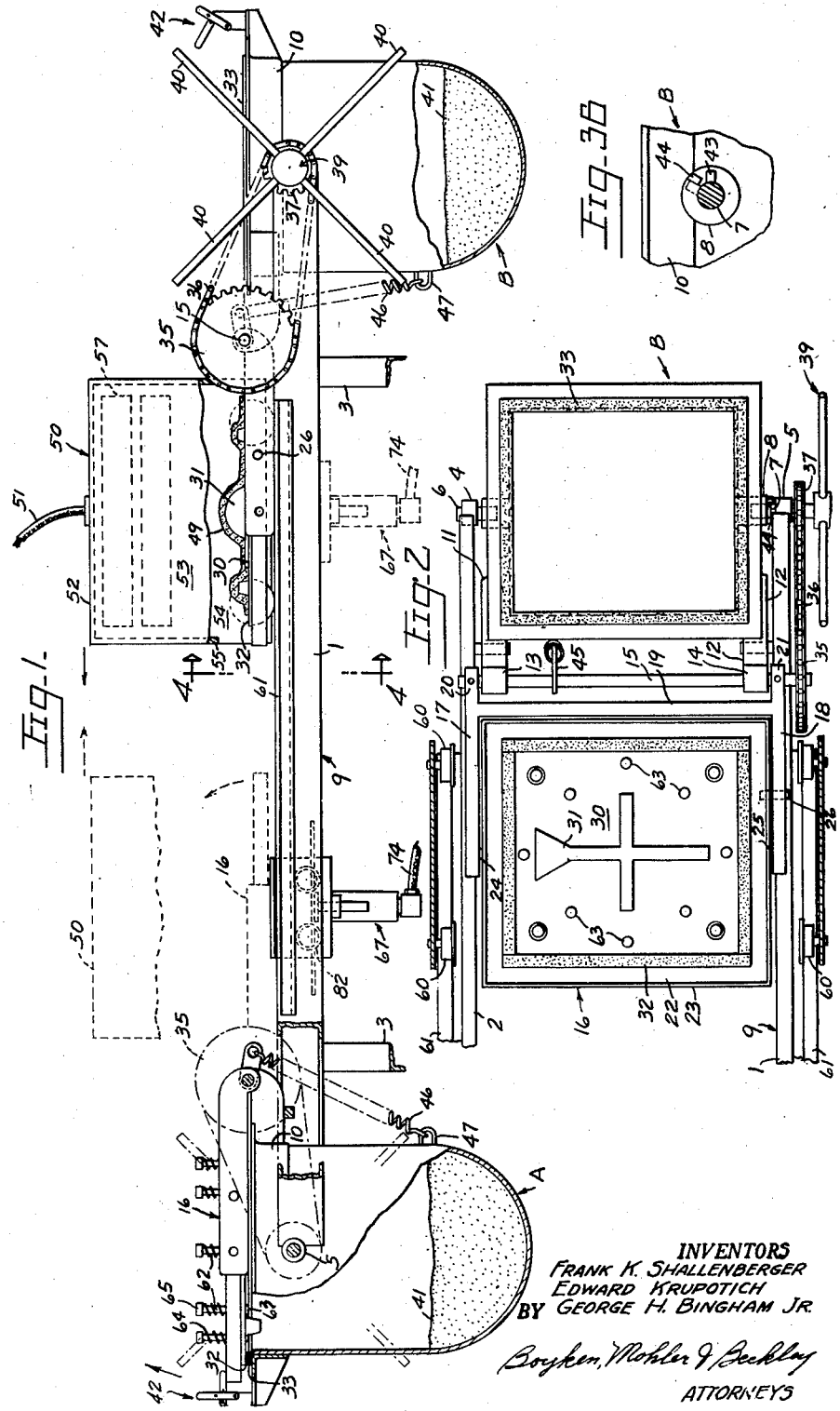
INVENTORS
FRANK K. SHALLENBERGER
EDWARD KRUPOTICH
BY GEORGE H. BINGHAM JR.
ATTORNEYS Dec. 23, 1958   F. K. SHALLENBERGER ET AL   2,865,066
SHELL MOLDING APPARATUS
Filed March 2, 1953   4 Sheets-Sheet 2
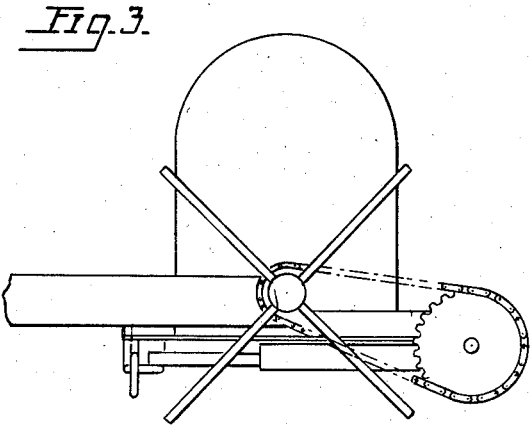
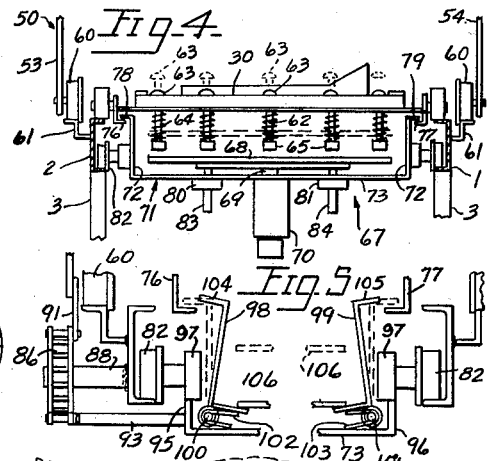
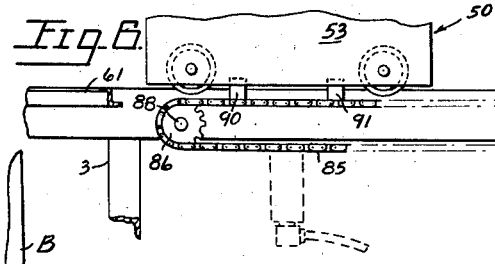
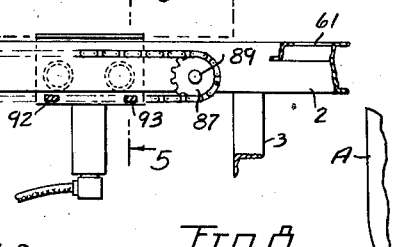
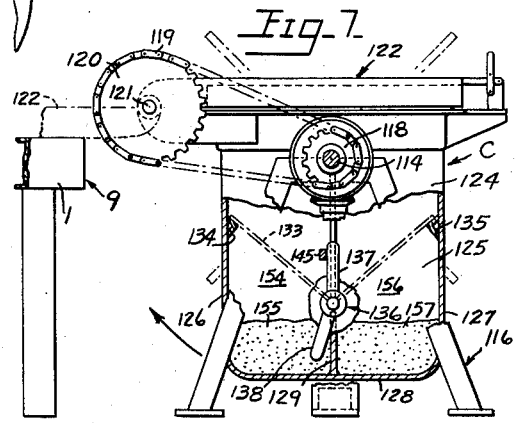
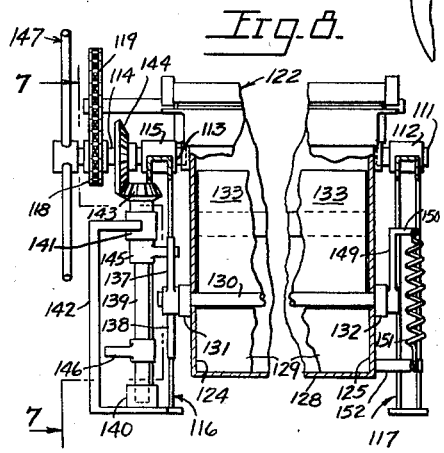
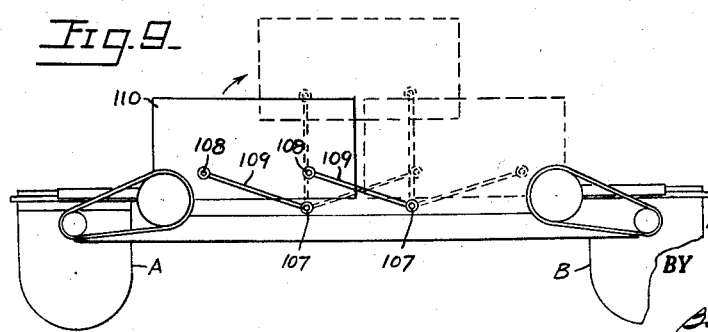
INVENTORS
FRANK K. SHALLENBERGER
EDWARD KRUPOTICH
BY GEORGE H. BINGHAM JR.
ATTORNEYS Dec. 23, 1958  F. K. SHALLENBERGER ET AL  2,865,066
SHELL MOLDING APPARATUS
Filed March 2, 1953  4 Sheets-Sheet 3
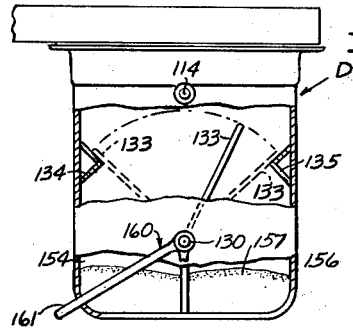
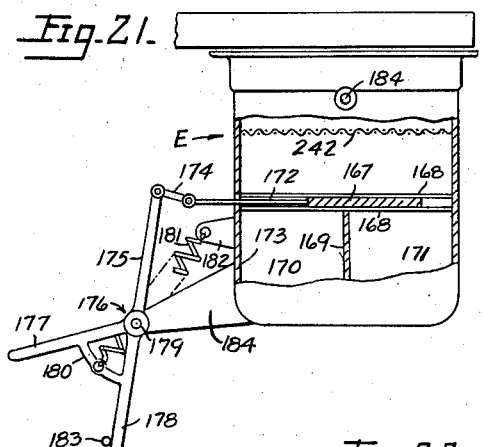
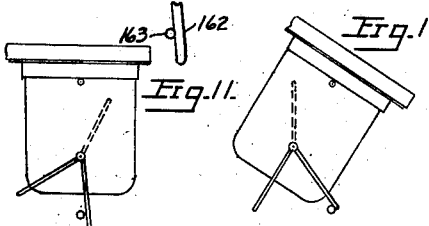
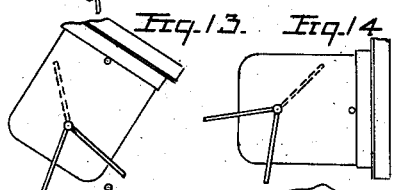
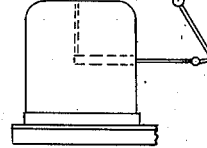
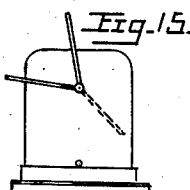
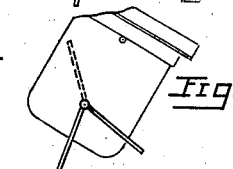
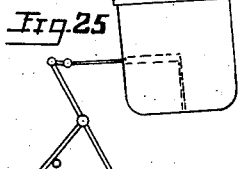
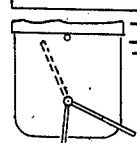
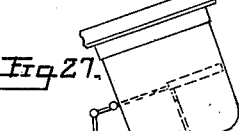
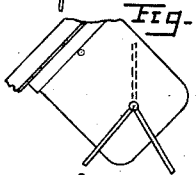
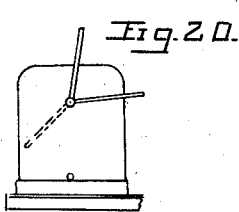
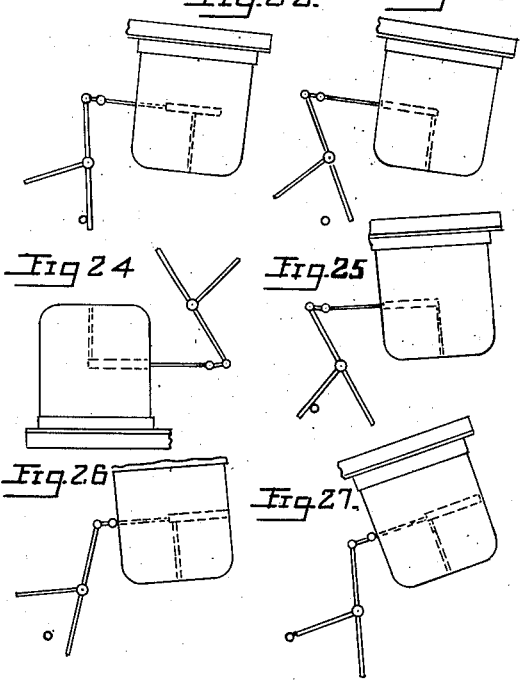
INVENTOR.
FRANK K. SHALLENBERGER
EDWARD KRUPOTICH
BY GEORGE H. BINGHAM JR
Boyken, Mohler & Beckley Dec. 23, 1958    F. K. SHALLENBERGER ET AL    2,865,066
SHELL MOLDING APPARATUS
Filed March 2, 1953      4 Sheets-Sheet 4
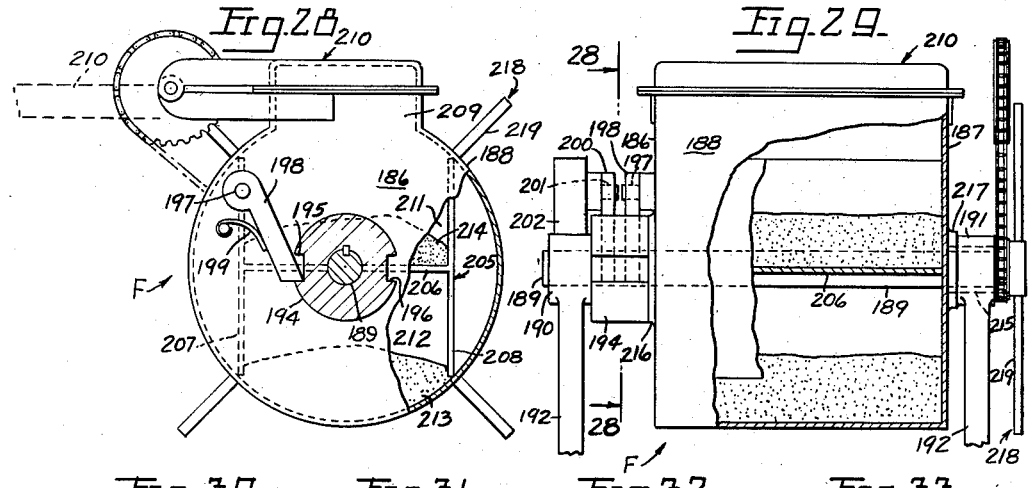
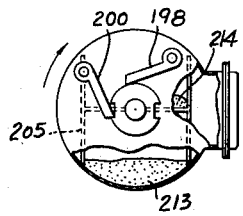
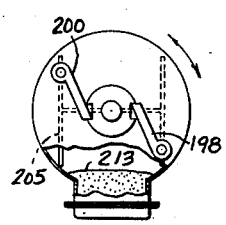
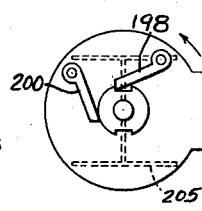
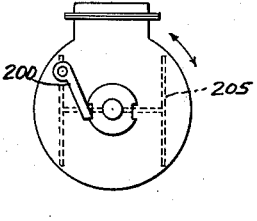
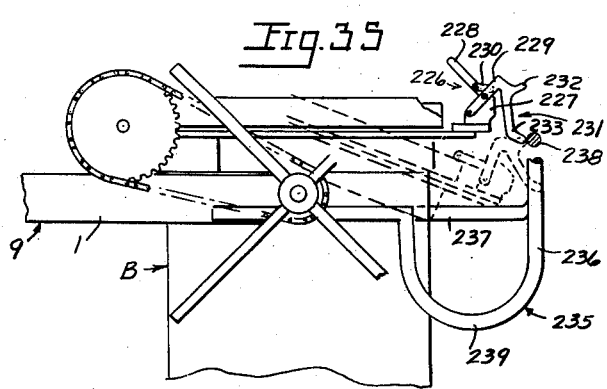
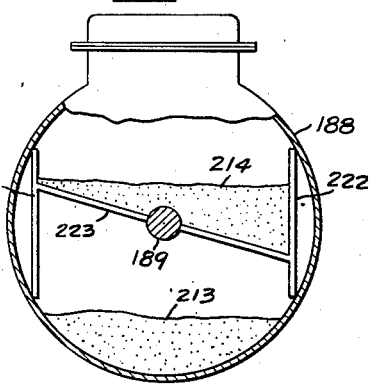
INVENTOR.
FRANK K. SHALLENBERGER
EDWARD KRUPOTICH
BY GEORGE H. BINGHAM JR.
Boyken, Mohler & Beckley United States Patent Office
2,865,066
Patented Dec. 23, 1958

2,865,066

SHELL MOLDING APPARATUS

Frank K. Shallenberger, Palo Alto, and Edward Krupotich and George H. Bingham, Jr., Stanford Village, Palo Alto, Calif., assignors to Shalco Engineering Corporation, Palo Alto, Calif., a corporation of California Application March 2, 1953, Serial No. 339,562

24 Claims. (Cl. 22—20)

This invention relates to shell molding processes wherein the mold from which a casting is to be made is formed of a mixture of sand and thermo-setting plastic or resin.

More particularly the present invention relates to a novel method and apparatus for carrying out the mold forming operation.

Although shell molding has been widely adopted in the past because of its numerous advantages over green sand molding, nevertheless most applications of the process have been carried out by mass production techniques. Thus, although effective machinery has been evolved to automatize the steps in the shell molding process, small scale operations have not, thus far, been widely carried out. It will be understood that, to take advantage of the superiority in quality of castings obtained by shell molding it is necessary, in the case of the small foundry, to provide means for competing with older methods by reducing the cost of the molding operation. This is especially important in view of the fact that the mold material is considerably more expensive for shell molding than for green sand molding.

The main object of the present invention is therefore the provision of a simple, inexpensive shell molding apparatus which is extremely efficient and yet has an inherent flexibility essential to small operations and not found in mass production apparatus of like nature.

Another object of the invention is the provision of a dual molding apparatus having one curing oven which is adapted to be employed practically continuously thus effecting a savings in power consumption. This object is particularly important in view of the fact that the curing operation is an intermittent one insofar as the shell molding operation per se is concerned.

Still another object of the invention is the provision of an improved dump box for the molding mixture.

Yet another object of the invention is the provision of a novel method and apparatus for producing a shell mold composed of different grades of molding material. In this connection it should be noted that the resin-sand mix employed for shell molding is relatively expensive because of the expense of the thermo-setting plastic or resin employed with the sand. By using a fine grain sand, a smooth casting surface is obtained. However, the finer the sand the greater its expense and the greater the concentration of plastic required to produce the necessary sand-plastic bond. Therefore, it is desirable to form the layer of the mold that is adjacent the casting surface from a fine sand mix and the remainder of the mold from a courser mix. In addition to the savings in cost effected by this procedure, a more porous mold is attained thus facilitating the escape of gases and adding to the smoothness of the casting surface.

Other objects and advantages will be seen from the following specification and from the drawings wherein:

Fig. 1 is a side elevational view of the dual dump box apparatus of the present invention with portions broken away to show internal structure.

Fig. 2 is a top plan view of the right hand end of the apparatus of Fig. 1 showing the pattern support in open position.

Fig. 3 is a side elevational view of the right hand end of the apparatus of Fig. 1 showing the dump box in inverted position.

Fig. 4 is a transverse cross sectional view of the apparatus as taken along lines 4—4 of Fig. 1 and showing the stripping means in stripping relationship with the pattern support.

Fig. 5 is an enlarged fragmentary view of a modified form of stripping means.

Fig. 6 is a side elevational view of the means for operatively connecting the oven and the stripping means which constitutes another modification of the invention.

Fig. 7 is a side elevational view partly broken away and in section of a modified form of dump box adapted to be rotated more than one complete revolution and which modified form is adapted to be substituted for the dump boxes of Figs. 1 and 2.

Fig. 8 is an end elevational view of the dump box of Fig. 7.

Fig. 9 is a greatly reduced semi-schematic side elevational view of the dual dump box arrangement of Fig. 1 showing a modified form of the means for supporting the oven.

Fig. 10 is a side elevational view of a modified form of dump box having separate compartments therein for different grades of molding material. Portions of the dump box are broken away to show internal structure.

Figs. 11–20 are reduced semi-schematic side elevational views of the dump box of Fig. 10 showing the same in different positions during rotation thereof.

Fig. 21 is a side elevational view of a modified form of dump box having separate compartments therein for different grades of molding material.

Figs. 22–27 are reduced semi-schematic side elevational views of the dump box of Fig. 23 showing the same in different positions during rotation thereof.

Fig. 28 is a side elevational view partly broken away and in section of still another modified form of dump box having a rotatable material support.

Fig. 29 is an end elevational view partly broken away and in section of the dump box of Fig. 28.

Figs. 30–33 are reduced semi-schematic side elevational views of the dump box of Fig. 28 showing the same in different positions during rotation thereof.

Fig. 34 is a cross-sectional view of the dump box of Fig. 30 showing a modified form of material support.

Fig. 35 is a side elevational view of the right hand dump box of Fig. 1 showing the clamp for securing the pattern support to the dump box and the means for automatically actuating the same.

Fig. 36 is an enlarged fragmentary view of the dump box B showing the means for swinging the same.

In detail, and referring to Fig. 1 a pair of dump boxes A and B are swingably supported at opposite ends of a frame generally designated 9 and comprising a pair of elongated parallel channel members 1, 2 which are supported at a suitable elevation from the floor by means of legs 3.

Rigidly secured to opposite ends of said members 1, 2 are bearings 4, 5. Bearings 4 rotatably receive journals 6 which in turn are rigidly secured to one side of dump boxes A, B and bearings 5 rotatably receive shafts 7 which are rotatably received in bosses 8 on the opposite side of the dump boxes.

The dump boxes A, B are similar, one only being herein described, and each is open at one end, which end is normally directed upwardly. Said open end is stiffened by a peripherally extending angle 10 which may be welded to the dump box.

Extending inwardly of the dump box frame 9 and rigidly secured at their outer ends to opposite sides of the dump boxes are a pair of arms 11, 12 which are provided at their inner ends with bearings 13, 14 respectively. Rotatably received in said bearings 13, 14 and extending through the same is a transverse shaft 15 which extends oppositely outwardly of bearings 13, 14 and is secured at its outer ends to a pattern support generally designated 16. This pattern support comprises a pair of parallel legs 17, 18 extending longitudinally of the dump box frame 9, and an integral cross piece 19 (Fig. 2). A pair of ears 20, 21 which may be a continuation of legs 17, 18 respectively extend outwardly from the opposite side of cross piece 19 and are rigidly secured to shaft 15 for rotation therewith.

Supported between legs 17, 18 is a rectangular pattern frame 22 which may be a flat plate having an upstanding peripherally extending flange 23. Frame 22 is positioned between and coplanar with legs 17, 18 and may, if desired, be pivotally secured by means of journals 24, 25 to legs 17, 18 respectively so as to be swingable out of the plane of said legs. However, it is preferable, as will subsequently be explained, that the frame 23 be rigidly secured to legs 17, 18. In the event that a pivoted frame is desired, the same may be fixed relative to legs 17, 18 as by a pin 26 which extends through leg 18 and into flange 23 (Fig. 2). This pin may be removed if it is desired to swing the pattern.

From the above described structure it is apparent that each pattern support may be swung about shaft 15 with reference to its associated dump box to a closed position over the open end of said dump box as is shown at dump box A (Fig. 1) or to an open position as shown at dump box B wherein the pattern support is 180° away from its closed position. It will be seen from Figs. 1, 2 that the legs 17, 18 of the pattern support rest on the upper flange of channel members 1, 2 when said support is in open position.

A pattern, generally designated 30 (Fig. 2) may be secured by any convenient means to the pattern frame 22. In Figs. 1, 2 a generally rectangular pattern is shown and it will be understood that the projections formed thereon are complementary to one half the shape of the mold to be formed. A projection of simplified shape is indicated at 31 (Figs. 1, 2).

Peripherally encircling the pattern 30 is a gasket 32 which may be fixedly secured to said gasket in any convenient manner. When the pattern is swung to closed position on the dump box, gasket 32 is adapted to engage a correspondingly formed gasket 33 secured to the upwardly facing leg of angle 10 (Fig. 1).

Secured to the end of shaft 15 that is adjacent leg 18 of the pattern support is a relatively large sprocket wheel 35 which is driven by a chain 36. For the purpose of driving this chain 36, a small sprocket 37 is secured to shaft 7 which extends through bearing 8. It will be understood that boss 8 and shaft 15 are relatively rotatable and no direct drive connection is effected between them. Also provided on shaft 7 is a windlass generally designated 39 having radially outwardly extending arms 40 adapted to be grasped by an operator for turning sprocket 37.

With reference to Fig. 1, upon clockwise rotation of the windless 39 of dump box B the pattern support will be swung with shaft 15 clockwise from its open position to a closed position over the dump box. In Fig. 1, dump box A is shown with the pattern support in closed position, its associated windlass having been swung counterclockwise inasmuch as dump boxes A, B are arranged to opposite hands.

Upon further clockwise rotation of windlass 39 it will be apparent that the dump box B itself will swing clockwise so that the same may be brought to an inverted position as seen in Fig. 3.

The dump boxes A, B, are adapted to contain a charge of molding material 41 hereinbefore described and which material falls on to the pattern 30 when the dump box is in the inverted position of Fig. 3. The pattern 30 has been previously heated (in a manner which will subsequently be described) to a temperature between 300° F. and 500° F. and this heat causes the plastic in the molding material to flow and surround the sand grains adjacent to the pattern, thus forming a thin partially cured shell structure. This principle of the shell molding process is well known.

The dump box B may then be rotated in the opposite direction (counterclockwise) and returned to its upright position shown in Fig. 1. During this step, excess material 41 which has not adhered to the pattern will fall downwardly into the bottom of the dump box to be used again on the next inversion.

On the outer ends of the dump boxes A, B are conventional toggle clamps 42 which are adapted to be manually actuated to releasably secure the pattern support to its associated dump box before inversion.

Inasmuch as a relatively great strain is transmitted through chain 36 to effect inversion of the dump box we prefer to provide a radial extension 43 (Fig. 36) integral with shaft 7 and a projection 44 on boss 8 spaced from said extension slightly less than one revolution from sprocket 37 so that, when the pattern support is closed, further rotation of windlass 39 will transmit the impressed torque directly through extension 43 and projection 44 to the dump box.

For the purpose of overcoming some of the eccentric loading impressed by the pattern 30 and its support on shaft 15, an arm 45 is provided on shaft 15 extending outwardly from the opposite side of the pattern. A tension spring 46 is secured at one of its ends to said arm and at its other end to a staple 47 rigidly secured to the dump box adjacent its bottom.

After the pattern support has been swung to its open position as shown at dump box B in Fig. 1 the shell mold 49 which is adherently secured to the pattern 30 is cured by the heat from an oven 50. This oven is conventional insofar as general construction is concerned in that it is provided with electrically heated elements 57 to which electrical power is transmitted through flexible cable 51, which in turn may be secured to a source of power (not shown) so as to permit limited movement of the oven in a manner to be described.

Oven 50, which is open at its lower side is provided with a top 52, opposite lateral sidewalls 53, 54 and opposite end walls 55, 56 which terminate short of the bottom of side walls 53, 54 so as to permit unobstructed horizontal movement of the oven over the projections 31 on pattern 30 (Fig. 1).

Along the lower edges of lateral sidewalls 53, 54, the oven 50 is provided with wheels 60 for supporting the oven for movement longitudinally of the frame 9. Wheels 60 rest on tracks 61, which are respectively secured along the outer sides of channel members 1, 2 of said frame.

From the above described structure it will be apparent that, after the pattern support 16 has been swung to its open position as shown in dump box B (Fig. 1), the oven 50 may be translated on wheels 60 from the dotted line position to the full line position at which position curing of the shell mold is performed at a temperature between 600°–1200° F. It may be noted at this point that after removal of the shell mold from the pattern 30 the heat remaining in the latter is sufficient to cause the required flow of the plastic or resin in the molding material during the subsequent inversion of the dump box and no additional heating of the pattern is required.

After the shell mold has been cured for the requisite length of time the oven 50 is moved out of heat transfer relationship with the shell mold 51 and the latter may then be removed from pattern 30.

Inasmuch as the shell mold 51 is adherently secured to the pattern 30, stripping means must be provided for forcing the mold off the pattern.

At spaced points on the pattern 30 are a plurality of bolts 62 having round heads 63. The shanks of bolts 62 are slidably received through complementarily formed holes in the pattern 30 so that the heads 63 of said bolts are seated against the pattern surface. On the opposite side of the pattern 30, compression springs 64 are provided around the shanks of bolts 62, which springs bear at one of their ends against the underside of pattern 30 and at their other ends against nuts 65 secured to bolts 62.

As best seen in Fig. 4 the bolts 62 depend from the pattern when the latter is in open position so that the nuts 65 are adapted to be simultaneously engaged by the stripping plate 68 of a stripping device generally designated 67. Stripping plate 68 is secured to a piston rod 69 operated by an air cylinder 70. Air cylinder 70 is secured to the underside of an elongated channel shaped member 71 extending transversely of the frame 9 and having a pair of vertically disposed legs 72 and a bottom 73 to which the cylinder 70 may be secured in any convenient manner. A flexible air conduit 74 (Fig. 1) is connected with cylinder 70 in the usual manner and is adapted to conduct air to the latter from a compressed air source (not shown) for moving the stripper plate 68 upwardly to engage nuts 65 of bolts 62 and urge said bolts upwardly for stripping the mold 51 from pattern 30 (Fig. 1).

To prevent the pattern support 16 from being swung upwardly about the axis of shaft 15 we provide a pair of angle clips 76, 77 on opposite sides of pattern support 16 which are adapted to be engaged by flanges 78, 79 integrally secured to the upper ends of legs 72 of channel member 71. From this structure it will be apparent when clips 76, 77 and flanges 78, 79 are in the relative position shown in Fig. 4, upward movement of the pattern support during the stripping operation will be resisted by flanges 78, 79 on the stripping device.

To insure proper alignment of stripper plate 68 and its channel shaped support 71, vertically extending rods 83, 84 may be rigidly secured at their upper ends to the underside of stripper plate 68 and slidably received in apertured guides 80, 81 carried by the stripper support 71.

The above described stripping device is provided with four wheels 82 which are received on the bottom flanges of the frame channel members 1, 2 so as to permit movement of the stripping device away from the dotted line position of Fig. 1 to the full line position in which latter position the device is adapted to strip the mold formed in dump box A.

At this point the essential operations of the apparatus may be described.

With the dump boxes A and B loaded with charges of shell molding material, the pattern support 16 may be swung to the open position such as shown at dump box B (Fig. 1) by rotating capstan 39 counterclockwise. If it is assumed that the operation is being commenced, the pattern 30 of dump box B may be heated by moving oven 50 to the full line position of Fig. 1. The oven 50 is then moved on tracks 61 toward dump box A and free from the pattern so that the latter may be swung on support 16 about the axis of shaft 15 by means of capstan 39.

When the pattern support is in closed position with the pattern 30 extending across the open end of the dump box, clamp 42 may be actuated to releasably secure the pattern support to the dump box with the gaskets 32, 33 in engagement to prevent the escape of molding material from the dump box.

Rotation of capstan 39 is continued so as to rotate dump box B by virtue of the torque impressed thereon through shaft 15 and also because the extension 43 is in direct engagement with projection 44 as hereinbefore described. In this connection, it is obvious that the extension 43 will not engage projection 44 until the dump box is in closed position. It will also be noted that the number of teeth on sprocket 37 should be slightly more than one half the number of teeth on sprocket 34 for this purpose.

When the dump box B has reached the inverted position of Fig. 3, it is held in this position until investment of the shell mold on the pattern is complete, that is, until a thin, partially cured shell of sufficient thickness is adherently secured to the heated pattern. The investment step is usually sufficiently complete in ten or twelve seconds.

The windlass 39 is then rotated counterclockwise until the dump box B is returned to its normal position. The clamp 42 is then released and the pattern support 16 swung to open position as shown in Fig. 1.

Oven 50 is then moved into curing position over the pattern and curing is carried out for between 40 and 60 seconds. The stripping device 67 is then translated along frame 9 on wheels 82 until the same is centered under the pattern 30 and flanges 78, 79 are directly above angle clips 76, 77. Air under pressure is then conducted to air cylinder 70 through a suitable foot actuated valve (not shown) or the like, and the mold 51 stripped from pattern 30.

During the above described operations of closing the pattern support on the dump box B inverting the dump box, investing, reinverting and opening the dump box, the oven 50 is, of course, in heat transfer relationship with the pattern 30 of dump box A. And when the stripping device 67 is moved into stripping relationship with dump box A, the oven 50 will be moved into curing relationship with the mold formed in dump box B.

By the apparatus herein described, a cycle of operations for one dump box may be completed in about 80 seconds, approximately half of which time is consumed during the curing process. It will therefore be apparent that the oven 50 is in substantially constant use and operating at its maximum efficiency. Furthermore by the simple apparatus above described the output of shell molds is approximately twice as great as that produced with one dump box and no undue amount of exertion is required by the operator.

As an improvement over the above described apparatus advantage may be taken of the fact that the oven 50 and the stripping device 67 are never employed on the same pattern at the same time so that said oven and said stripping device may be interconnected for movement together as seen in the modifications disclosed in Figs. 5, 6.

Referring to Fig. 6, an endless chain 85 is provided along side frame 2 and extending between sprockets 86, 87 which in turn are rotatably mounted on shafts 88, 89 respectively extending horizontally outwardly from and secured to frame member 2.

Oven 50 is secured to the upper run of chain 85 by a pair of horizontally spaced lugs 90, 91 and the stripping device is secured by extensions 92, 93 to the lower run of chain 85 (Figs. 5, 6).

The chain 85 is positioned centrally between dump boxes A, B, and oven 50 and the stripping device are spaced apart relative to said chain so that when oven 50 is moved to a position in heat transfer relationship with the pattern or dump box B, the stripping device will be centered under pattern 30 of dump box A and therefore in stripping relationship with said pattern.

It will be apparent that when the curing of the shell mold of dump box B is completed, the oven 50 may then be moved by the operator on tracks 61, 62 to heat transfer relationship with the pattern of dump box A, which pattern has been just previously swung to open position. By this movement the stripping device will be brought into stripping engagement with the now cured shell mold of dump box B which is ready to be stripped from its pattern. After this stripping step has been performed the stripping device must not be moved, otherwise the oven 50 will be moved away from its curing position relative to dump box A. Inasmuch as clips 76, 77 on the pattern support 16 are in engagement with flanges 78, 79 on the stripping device 67 in the apparatus shown in Figs. 1 and 4, the pattern support 16 cannot be swung from open to closed position when the stripping device is present. For this reason, the stripping device must be modified as shown in Fig. 5 where parts which are identical with corresponding parts in Fig. 4 bear the same number.

In the form of Fig. 5, the bottom 73 of the stripping device is provided with a pair of upstanding flanges 95, 96 to which are secured bearings 97 for rotatably supporting the wheels 82.

In lieu of the rigid legs 72 of channel member 71 in Fig. 4 a pair of generally vertically extending arms 98, 99 are provided (Fig. 5) which are pivotally secured at their lower ends on pins 100, 101, fastened to bottom 73 of the channel member. Torsion springs 102, 103 surround pins 100, 101 and their ends engage arms 98, 99 and bottom 73 so as to urge said arms oppositely outwardly at all times from the full line position of Fig. 5. The upper ends of arms 98, 99 are bent to provide oppositely outwardly extending flanges 104, 105 respectively which normally clear clips 76, 77 on pattern support 16, but which are in engaging relationship with said clips when swung oppositely outwardly to the dotted line positions of Fig. 5.

The stripper plate 106 (Fig. 5) which corresponds to the stripper plate 68 of Fig. 4 is somewhat the same as the latter and is in engagement at its ends with a pair of oppositely inwardly projecting extensions on arms 98, 99 (Fig. 5). Upon upward movement of stripper plate 106 from the full line position of Fig. 5, the arms 98, 99 will be swung oppositely outwardly to the dotted positions with flanges 104, 105 in engaging relationship with clips 76 (Fig. 5). Upon retraction of the stripper plate 106 downwardly will swing arms 98, 99 inwardly thus permitting the pattern support to be swung from open to closed position relative to the dump box.

Modified oven support

A modified form of oven supporting means is shown in Fig. 9 wherein the dump boxes A and B are shown schematically and the frame 1 is the same as that shown in Fig. 1. In this case, the oven 110 is provided with a pair of links 109 on each side, which links are pivotally secured at one of their ends to the oven 110 as at 108, and pivotally secured at their opposite ends to the frame 1 as at 107.

Oven 110 is thus adapted to be swung as indicated from the full line position in heat transfer relationship with the pattern of dump box A to the dotted line position in heat transfer relationship with the pattern of dump box B.

An advantage of this parallelogram supporting means for the oven resides in the fact that no openings need be left in the end walls of the oven to permit the oven to clear the pattern as is the case with the end walls 55, 56 of Fig. 1. In addition, the oven may be brought downwardly closer to the pattern thus making more efficient use of its radiant heat.

Compartmented dump box

As pointed out before, it is desirable to form the layer of mold material that is adjacent the pattern surface with a fine mix, that is, with relatively fine sand and a relatively high concentration of plastic so as to achieve a pattern of good accuracy and detail. However, if the entire mold is made from a fine mix, loss of economy results because of the relatively high cost of the mix. Furthermore, if a fine mix is used throughout the mold, the porosity of the mold becomes relatively low so as to impede the escape of gases from the mold surface thus resulting in a rough casting surface.

We have therefore provided a compartmented dump box which is adapted to contain two grades of mold material, one a fine mix, and the other a relatively coarse mix. As will now be described, the fine mix is first deposited on the heated pattern for a short length of time and then removed. Thereafter the coarse mix is deposited on the relatively thin partially cured mold of fine mix mold material for a relatively longer time so as to achieve a shell mold of the desired total thickness.

Referring now to Figs. 7, 8 a dump box C is shown which may be substituted for either dump box A or dump box B of Fig. 1.

Dump box C is provided on one side with a rigid shaft 111 which is rotatably supported in a bearing 112. On the opposite side a boss 113 is provided rigid with dump box C and which boss rotatably receives one end of a relatively long shaft 114 which, in turn, is rotatable in a bearing 115 similar to bearing 112. These bearings 112, 115 are respectively supported off the floor by supports 116, 117.

Shaft 114 is provided with a sprocket 118, similar to sprocket 37 of Fig. 1, and which through a chain 119 drives a relatively larger sprocket 120 mounted on the pattern support shaft 121. A pattern support, generally designated 122, similar to pattern support 16 of Fig. 1 closes the open end of the dump box C in the usual manner. It will be apparent that the main frame 1 of Fig. 1 may be reduced in length inasmuch as the dump box C is separately supported, but the pattern support 122 nevertheless may be swung to the dotted line position indicated in Fig. 7 with said support resting on the frame members 1 and 2.

In detail, dump box C comprises a pair of lateral sidewalls 124, 125, a pair of endwalls 126, 127 and a bottom 128. Extending between sidewalls 124, 125 is an interior vertical wall 129 which engages the bottom 120 along its lower edge and which may be rigidly secured as by welding to said sidewalls and said bottom. Adjacent, but free from the upper edge of said wall 129, is a shaft 130 which passes through sidewalls 124, 125 and is rotatably supported in bearings 131, 132 secured to sidewalls 124, 125.

Secured along the upper side of shaft 130 is a flat closure plate 133 which is adapted to swing with shaft 130. A pair of elongated stop members 134, 135 are rigidly secured as by welding to endwalls 126, 127 respectively so that the free margin of plate 133 seats on said stops when said plate is swung as indicated in Fig. 7.

On the same side of dump box C as shaft 114 is a lever member generally designated 136 and which comprises a pair of arms 137, 138. At the juncture of said arms the member 136 is secured to the adjacent end of shaft 130.

Alongside member 136 is a vertically extending shaft 139 rotatably supported at its lower end in a bearing 140 and at its upper end in a bearing 141. Bearings 140, 141 may be carried conveniently by a unitary frame such as indicated at 142.

The upper end of shaft 139 is provided with a bevel gear 143 which is in mesh with a bevel gear 144 on shaft 114. This bevel gear 144 has twice the number of teeth of bevel gear 143 so that vertical shaft 139 rotates at twice the rotational speed of the dump box shaft 114.

Secured to shaft 139 is a dog 145 which, upon rotation of shaft 139, is adapted to engage the free end of arm 137. Similarly, a dog 146 on saft 139 is adapted to engage arm 138. Dogs 145, 146 are spaced 180 degrees apart on shaft 139.

Shaft 114 is provided with a windlass generally designated 147 which is identical to windlass 39 of Fig. 1. By turning windlass 147 so as to turn shaft 114 clockwise (Fig. 7) the pattern support 122 will first be swung from the open position as indicated by dotted lines in Fig. 7 to the closed position as shown in full lines in the manner described in connection with Fig. 1.

Upon further rotation of the windlass 147 the dump box C will rotate in bearings 112, 115 to its inverted position. During the above operations dog 145 swings on shaft 139 and in turn moves arm 137 of lever 136 so as to swing closure plate 133 from engagement with stop 134 through the top dead center position shown in full line in Fig. 7 to engagement with stop 135.

At the opposite end of shaft 130 from lever 136 is an arm 149 which extends generally upwardly from shaft 130 and is secured at its lower end thereto. The upper end of arm 149 is provided with a horizontally extending portion 150 to which is secured the upper end of a generally vertically extending helical tension spring 151 which is secured at its lower end to a rod 152 integrally connected at its lower end to side 125 of dump box C at a point adjacent the bottom of the latter.

It will be apparent from Figs. 7, 8 that spring 151 will urge closure plate 133 to seated position on either stop 134 or 135 depending upon the side of dump box C to which lever 136 swings said closure plate.

In the position shown in Fig. 7, rotation of the dump box C in a clockwise direction causes dog 145 to swing the plate 133 toward stop 135 on endwall 127 and when said plate passes the dead center position shown in full line, spring 151 (Fig. 8) will complete the swing of the closure plate to a position seating on stop 135.

The interior wall 129 and endwall 126 define a compartment 154 which may contain a charge of fine mix 155 and a compartment 156 is defined by interior wall 129 and endwall 127 containing course mix 157.

Referring again to Fig. 7, rotation of dump box C will cause the fine mix 155 from compartment 154 to drop on the pattern in pattern support 122 during inversion of said dump box to a position 180 degrees from that shown in Fig. 7. The dump box may be held in this inverted position for a relatively short length of time so as to result in investment of the pattern with a relatively thin shell of fine mix.

The dump box is then rotated in the same direction one revolution to the same inverted position, during which revolution the shaft 139 rotates one and one half revolution and dog 146 engages arm 138 of lever 136 to swing closure plate 133 from closing relationship with course mix compartment 156 to closing relationship with fine mix compartment 154. During the second inversion the pattern will therefore be covered with the course mix and the length of time of the second investment is preferably longer than the first so as to form a shell mold of sufficient thickness to sustain the normal handling and casting operations.

It will be apparent that the action of closure plate 133 is such that the material which lands on top of it will be thrown into the compartment in which it belongs, thus insuring segregation of the fine and course mix.

After the mold has been formed, the windlass 147 is swung in a counterclockwise direction (Fig. 7) so as to swing the pattern support 122 to open position for the subsequent curing and stripping operations hereinbefore described.

A great advantage of the above described apparatus, aside from the economy and better pattern resulting from using two grades of material, lies in the fact that the continuous rotation of the dump box in the same direction facilitates the operation from the operator's standpoint.

Modified compartmented dump box

In Fig. 10 is shown a dump box D which is a modified form of the dump box of Figs. 7, 8 and wherein the structure is identical with that of dump box C except that the closure plate shaft 130 is provided with a bifurcated member 160 instead of the lever 136 of Fig. 7. Member 160 comprises a pair of arms 161, 162 extending radially outwardly of shaft 130 from their common juncture. It will be understood that the opposite side of the dump box from that shown is provided with a spring such as spring 151 of Fig. 8 for yieldably urging closure plate 133 against either stop 134 or stop 135.

Spaced downwardly from the bottom of dump box D is a stationary member 163 which is adapted to engage one or the other of arms 161, 162 upon rotation of dump box D. Member 163 may simply be a rod rigidly secured at its lower end to the floor (not shown) and provided with a horizontally extending portion for engagement with said arms.

The length of arms 133 and the position of stationary member 163 are predetermined in such a manner that an intermittent movement of closure plate 133 is effected upon swinging dump box D in the manner now to be described.

In the normal upright position of dump box D the closure plate 133 is swung away from stop 135, but is urged toward said stop by spring 151 (Fig. 8).

By reference to the schematic views Fig. 11 to Fig. 20, it is seen that upon further clockwise rotation of dump box D, closure plate 133 is swung into engagement with stop 134 and arm 162 is swung to a position clear of stop 163 (Fig. 13) permitting said dump box to be swung to its inverted position (Fig. 15) with the mix from compartment 156 deposited on the pattern. It will be understood in this connection that if compartment 156 empties first it must contain the fine mix and compartment 154 the course mix.

After the fine mix is deposited on the pattern for the desired length of time, the dump box D is rotated counterclockwise one revolution during which revolution the arm 161 engages stationary member 163 and swings closure plate 133 to closing relation with compartment 156, leaving compartment 154 open for depositing course mix on the pattern. It will be seen from the schematic views Figs. 15, 16 that the fine mix from compartment 156 is returned thereto in a normal manner before closure plate 133 is swung to closing relationship with the same. Upon continuation of the rotation of dump box D to inverted position in the opposite direction from which it had previously been inverted, the course sand of compartment 154 will be deposited on the pattern.

It will therefore be seen that the same steps are performed with dump box D as with dump box C except that the dump box rotates 180 degrees in one direction, 360 degrees in the reverse direction and 180 degrees in the first direction.

Compartmented dump box—sliding closure

Figs. 21–27 illustrate another form of dump box E wherein the closure plate 167 is reciprocable between the endwalls of the dump box in guides 168 attached to the lateral sidewalls. An interior wall 169 divides the dump box D into compartments 170, 171.

Secured to one end of plate 167 is an operating rod 172 which passes through a complementarily formed opening in the end wall 173 of the dump box D and is pivotally secured at its outer end to a link 174 which in turn is pivotally secured to an operating arm 175 of a closure actuating member generally designated 176.

Member 176 is bifurcated at its side opposite arm 175 to provide a pair of arms 177, 178 and said member 176 is swingably secured at the juncture of arms 175, 177, 178 on a pivot 179 carried at the outer end of a bracket 184 secured to end wall 173.

Extending between arms 177, 178 at points intermediate their ends is a cross piece 180 to the center of which is secured one end of a helical extension spring 181. The other end of spring 181 is secured to a lug 182 on endwall 173.

Stationarily secured relative to dump box E is a member 183 similar in function to member 163 of Fig. 10.

In the normal position of the dump box E as seen in Fig. 21, the closure 167 is being moved from a position in closing relationship with compartment 171 toward a position in closing relationship with compartment 170. This movement of closure plate 167 is being accomplished through the actuation of arm 178 of member 176 by stationary member 183. As seen in Figs. 22, 23, the engagement of stationary member 183 with arm 178 continues until the line of action of spring 181 moves from the side of pivot 179 adjacent arm 177 to the side adjacent arm 178 at which point the closure 167 snaps into closing relationship with compartment 170 (Fig. 23). The dump box E continues to move to inverted position as seen in Fig. 24 at which point movement is stopped so that the pattern is invested with fine mix from compartment 171 in a similar manner as above described. The direction of rotation of the dump box is then reversed and, upon counterclockwise movement, the arm 178 clears stop member 183 so that the latter engages arm 177 for moving closure plate 167 into closing relationship with compartment 171. Upon continuing the counterclockwise rotation of the dump box, course mix from compartment 170 is deposited on the pattern to complete the investment step.

The dump box of Fig. 21 has the advantage of permitting more usable space in the compartments and minimizes the space required for the closure plate. Similarly, for a given capacity of dump box, the required size may be considerably reduced.

*Compartmented dump box with revolvable support*

Figs. 28, 29 illustrate a somewhat different type of dump box F which is less burdensome on the operator than those hereinbefore described. This dump box F comprises a generally cylindrical container having a pair of opposed endwalls 186, 187 and a cylindrical sidewalls 188. The dump box is supported on an axially extending shaft 189 which is rotatably received at its ends in bearing 190, 191 respectively. These bearings may be supported off the floor by suitable supports 192.

Between bearing 190 and endwall 186 and keyed to shaft 189 is a generally cylindrical collar 194 provided with a pair of axially extending, oppositely outwardly opening grooves 195, 196.

Dump box F is not secured to shaft 189, but is rotatable through bearings 216, 217 integral with endwalls 186, 187 respectively.

Projecting outwardly from endwall 186 and rigid therewith is a pin 197 which pivotally supports one end of a dog 198 which in turn is engageable at its other end with grooves 195, 196 in collar 194 (Fig. 28).

A leaf spring 199 secured at one end to endwall 186 of dump box F yieldably urges dog 198 into engagement with collar 194 at all times.

Alongside dog 198 and separate from the dump box F is another dog 200 similar to dog 198, but pivotally carried by a pin 201 on an extension 202 extending upwardly from the adjacent frame 192. This dog 200 is also yieldably urged toward collar 194 by a leaf spring on frame 202 in like manner as dog 198.

Within dump box F is a generally H-shaped mold material support generally designated 205 which extends between endwalls 186, 187. This material support comprises a central plate 206 rigidly secured to shaft 189 and preferably formed in two sections for securement to said shaft. A pair of side plates 207, 208 are centrally secured to opposite ends respectively of central plate 206 and are in sliding engagement with the interior surface of sidewalls 188 and endwalls 186, 187.

The cylindrical sidewalls 188 are interrupted as at 209 to provide an opening which communicates between the interior of dump box 188 and the usual pattern support generally designated 210.

From Fig. 28 it will be seen that the upwardly opening channel-shaped portion of the H-shaped support 205 defines a compartment 211 while the downwardly opening channel-shaped portion of the support 205 defines a compartment 212. In the drawings, compartment 212 is adapted to contain a fine mix of mold material 213 while compartment 211 is adapted to contain a courser mix 214.

In operation, and assuming the pattern from which the shell mold is to be made is in the pattern support 210, the dump box F is rotated by windlass 218 in a clockwise direction about shaft 189 so that dog 198 on the dump box swings out of groove 195 in collar 194 and the dog 200, which is carried by the separate frame 202, prevents rotation of collar 194 and the shaft 189 to which it is secured. Thus material support 205 is held stationary (Fig. 30) while the fine mix 213 is shifted along the cylindrical sidewalls 188 of the dump box until the latter is in the inverted position of Fig. 31 and said fine mix is deposited on the pattern in support 210. In this position after the desired degree of investment of fine mix is completed, the dump box F is rotated in a counterclockwise direction (Fig. 32). Dog 198 which is in dogging relationship with groove 196 causes the material support 205 to move with the dump box so that during rotation of the dump box back to its original position, the fine mix 213 will be received on the central plate 206 of compartment 212. In other words, during the movement of the dump box through two half revolutions in opposite directions back to its original position the material support 205 has moved through only one half a revolution. The result of this movement is that the compartments 211 and 212 have exchanged positions and the course mix is now on the bottom of the dump box and the fine mix is in compartment 212.

By rotating the dump box through the same steps as shown in Figs. 30-33, the pattern will be invested with the course mix.

It should be noted that the side plates 207, 208 of Fig. 28 are made sufficiently long so that they engage the charge of material that is resting on the bottom of the dump box as best seen in Fig. 28. This prevents swinging of the material support 205 relative to the dump box when such movement is not desired because of the frictional resistance to such movement offered by the material.

This same result may be accomplished by a somewhat different arrangement shown in Fig. 34. Here a relatively shallow material support 223 is shown having a pair of relatively short side plates 221, 222 in engagement with the sidewalls 188 of the dump box. The central plate 223, instead of being disposed at right angles to side plates 221, 222 is angularly disposed as seen in Fig. 34 so that the center of gravity of the charge 214 on central plate 223 is shifted so as to urge the support 223 in a clockwise direction at all times. Inasmuch as dog 200 prevents clockwise rotation of the support 220, the latter is stable at all times relative to the dump box.

The arrangement of Fig. 34 provides a somewhat greater capacity for the same size dump box inasmuch as the central plate 223 may be made relatively large. Furthermore, proper operation of the device does not depend upon there being a sufficiently large charge of material to frictionally engage side plates 221, 222.

The dump boxes of Fig. 28 and Fig. 34 are particularly adapted to manual handling inasmuch as there is practically no movement of the centers of gravity of the charges of mold material.

*Automatic clamping device*

Referring again to Figs. 1, 2, the conventional toggle clamps 42 for securing the pattern support 16 to the dump boxes A, B were described as manually actuatable.

An automatic clamp actuating operation may be achieved with the same equipment as shown in Figs. 1, 2 by a slight modification of the clamps and by the addition of an extension on the frame 1.

This automatic clamping apparatus is shown in Fig. 35 wherein parts which are the same as corresponding parts in Fig. 1 bear the same numerals.

Clamp 226 essentially comprises a base 227 to which are pivotally connected a pair of arms 228, 229 which are connected intermediate their ends by a link 230. Clamp 226 is shown in full line in Fig. 35 in open position. Upon swinging arm 229 manually in a counter-clockwise direction, the arm 228 is forced into engagement with the top of pattern support 16, and through the toggle action resulting from the presence of link 230 considerable force is exerted on said support. The clamp 226 may be opened by reversing the movement of arm 229. The above described elements of the clamp are conventional.

To make the clamping and unclamping operation automatic, we provide a bifurcated extension generally designated 231 and which includes a pair of legs 232, 233.

Secured to the frame 9 is a yoke generally designated 235 having a pair of arms 236, 237 adjacent opposite sides of the dump box and including a crosspiece 238, which is adapted to be engaged by one or the other of said arms upon rotation of the dump box.

If the dump box shown in Fig. 35 is otherwise the same as dump box B of Fig. 1 it will be apparent that upon clockwise rotation of the dump box, arm 232 will be engaged by crosspiece 238 thus urging the arm 228 into clamping relation with pattern support 16 as seen in the dotted position. At the same time, arm 233 is swung counterclockwise so that the same will be engaged by cross piece 238 when the dump box is swung counter-clockwise from its inverted position toward its normal upright position so that the clamp 226 returns to its open position after investment of the pattern and before the pattern support 16 is swung counterclockwise to its open position.

Arm 236 of yoke 235 must be provided with a bent portion 239 so as to clear the shaft 15 (Fig. 2) when the dump box B is swung to the inverted position of Fig. 3.

In connection with the apparatus shown in Figs. 1, 2 it has been pointed out that the pattern may be made rigid with the pattern support as seen in Figs. 7, 10, 21. However, if stripping is performed by vibrating the pattern, it is preferable that the pattern frame 22 be swingable about journals 24, 25 (Fig. 1) so as to invert the same and permit the mold to fall therefrom by gravity after vibration. In such a case pin 26 (Fig. 1) may be removed to permit such swinging.

In most cases, it is preferable to employ a positive stripping means and therefore the fixed pattern frame is preferable.

One advantage of the compartmented dump boxes which are swung 180 degrees in one direction, 360 degrees in the opposite direction and then 180 degrees in the first direction lies in the fact that the operator knows that swinging the dump box in one direction will dump fine mix on the mold while reversal will dump course mix.

The dump box of Figs. 28, 29 is particularly desirable because of its relatively high capacity for the space which it requires. In addition, a more direct fall of the mix on the pattern is obtained which is desirable and results in a more even mold.

In order to encourage the fall of the mix in a direction normal to the mold surface, it is desirable to provide a screen, such as shown at 242 (Fig. 21) between the mix and the pattern. Such a screen may be employed with any of the various types of dump boxes illustrated herein.

In connection with the dump box F of Figs. 28, 29, the windlass 218 may take several forms. Preferably, however, a sleeve 215 may be provided around shaft 189 and rigid with endwall 187 for mounting the windlass turning members 219.

The detailed description of the invention herein made is not to be taken as restrictive of the same as various modifications in design may be made without departing from the spirit of the invention as defined by the following claims, for example, it will be understood that the present invention contemplates other automatic means for opening and closing the mold material compartments.

We claim:

1. Shell molding apparatus comprising a pair of spaced dump boxes for containing molding material and having corresponding open ends, each of said dump boxes being provided with a pattern support adapted to receive a pattern thereon, means hingedly securing said supports to said dump boxes respectively for swinging said patterns from closed positions extending across said open ends to open positions substantially 180 degrees therefrom, a curing oven positioned between said dump boxes and supported for movement from a position in heat transmitting relationship with the pattern on one of said supports when said one support is in open position to a position in heat transmitting relationship with the pattern on the other of said supports when the latter is in open position, means swingably supporting said dump boxes for movement through 180 degrees for depositing molding material on said patterns and means for so rotating said dump boxes, stripping means for removing the mold from said patterns and means supporing said stripping means for movement from a position in stripping relationship with the pattern in one of said supports to a position in stripping relationship with the pattern in the other of said supports.

2. Shell molding apparatus comprising a pair of spaced dump boxes for containing molding material and having corresponding open ends, each of said dump boxes being provided with a pattern support adapted to receive a pattern thereon, means hingedly securing said supports to said dump boxes respectively for swinging said patterns from closed positions extending across said open ends to open positions substantially 180 degrees therefrom, a curing oven positioned between said dump boxes and supported for movement from a position in heat transmitting relationship with the pattern on one of said supports when said one support is in open position, means swingably supporting said dump boxes for movement through 180 degrees for depositing molding material on said patterns, and means for so swinging said dump boxes, said last mentioned means including a driving element operatively connected with said means for hingedly securing said pattern supports to said dump boxes whereby initial movement of said driving element in one direction when a pattern support is in open position swings the latter to closed position and subsequent movement swings the associated dump box.

3. In shell molding apparatus, a rotatably supported dump box having one open end adapted to receive a pattern thereon and a pair of compartments adjacent its other end communicating with said open end and adapted to contain different grades of molding material therein, a closure mounted in said dump box for movement from a position closing one of said compartments to a position closing the other of said compartments, means for rotating said dump box through two revolutions in one direction from a normal position with its open end uppermost, means actuatable upon rotation of said dump box one revolution from said normal position for moving said closure from closing relationship with one of said compartments to closing relationship with the other and means actuatable upon rotation of said dump box two revolutions from said normal position for moving said closure to closing relationship with said one compartment whereby different grades of molding material may be successively deposited on said pattern.

4. In shell molding apparatus, a rotatably supported dump box having one open end adapted to receive a pattern thereon and a pair of compartments adjacent its other end communicating with said open end and adapted to contain different grades of molding material therein, a closure mounted in said dump box for movement from a position closing one of said compartments to a position closing the other of said compartments, means for rotating said dump box through two revolutions in one direction from a normal position with its open end uppermost, means actuatable upon rotation of said dump box one revolution from said normal position for moving said closure from closing relationship with one of said compartments to closing relationship with the other and means actuatable upon rotation of said dump box two revolutions from said normal position for moving said closure to closing relationship with one compartment whereby different grades of molding material may be successively deposited on said pattern, a shaft extending through said dump box and swingably supporting said closure, said means for moving said closure comprising a rotatable member connected with said dump box for rotation at one half the rotational speed of said dump box, a lever carried by said shaft and positioned outside of said dump box, a pair of dogs carried by said rotatable member and engageable with said lever for swinging said gate upon rotation of said dump box, said dogs being positioned on opposite sides of said rotatable member whereby the same successively engage said lever upon consecutive rotations of said dump box.

5. In shell molding apparatus, a rotatably supported dump box having one open end adapted to receive a pattern thereon and a pair of compartments adjacent its other end communicating with said open end and adapted to contain different grades of molding material therein, a closure mounted in said dump box for movement from a position closing one of said compartments to a position closing the other of said compartments, means for rotating said dump box through two revolutions in one direction from a normal position for moving said closure from closing relationship with one of said compartments to closing relationship with the other and means actuatable upon rotation of said dump box two revolutions from said normal position for moving said closure to closing relationship with one compartment whereby different grades of molding material may be successively deposited on said pattern, a shaft extending through said dump box and swingably supporting said closure, said means for moving said closure comprising a rotatable member connected with said dump box for rotation at one half the rotational speed of said dump box, a lever carried by said shaft and positioned outside of said dump box, a pair of dogs carried by said rotatable member and engageable with said lever for swinging said gate upon rotation of said dump box, said dogs being positioned on opposite sides of said rotatable member whereby the same successively engage said lever upon consecutive rotations of said dump box, spring means for urging said gate to closing position on one of said compartments at all times whereby movement of said gate from one compartment a distance greater than one half its total travel will cause said gate to be urged to closing position on the other of said compartments.

6. In shell molding apparatus, a rotatably supported dump box having one open end adapted to receive a pattern thereon, and a pair of compartments adjacent its other end communicating with said open end and adapted to contain different grades of molding material therein, a gate swingably mounted in said dump box for movement from a position closing one of said compartments to a position closing the other of said compartments, a pattern support adapted to receive a pattern thereon and swingably mounted on said dump box for movement from a closed position with said pattern extending across said open end to an open position substantially 180 degrees therefrom, means for rotating said dump box including a driving shaft operatively connected with said pattern support for swinging the latter upon rotation of said driving shaft whereby initial rotation of said driving shaft when a pattern support is in open position swings the latter to closed position and subsequent rotation of said driving shaft rotates said dump box.

7. In shell molding apparatus, a rotatably supported dump box having one open end adapted to receive a pattern thereon, and a pair of compartments adjacent its other end communicating with said open end and adapted to contain different grades of molding material therein, a gate swingably mounted in said dump box for movement from a position closing one of said compartments to a position closing the other of said compartments, a pattern support adapted to receive a pattern thereon and swingably mounted on said dump box for movement from a closed position with said pattern extending across said open end to an open position substantially 180 degrees therefrom, means for rotating said dump box including a driving shaft operatively connected with said pattern support for swinging the latter upon rotation of said driving shaft whereby initial rotation of said driving shaft when a pattern support is in open position swings the latter to closed position and subsequent rotation of said driving shaft rotates said dump box, means actuatable upon rotation of said dump box one revolution from a normal position with its open end uppermost for swinging said gate from closing relationship with one of said compartments to closing relationship with the other, and means actuatable upon rotation of said dump box two revolutions from said normal position for swinging said gate to closing relationship with said one compartment.

8. In shell molding apparatus, a rotatably supported dump box having one open end adapted to receive a pattern thereon and a pair of compartments communicating with said open end and adapted to contain different grades of molding material therein, a closure mounted in said dump box for movement from a position closing one of said compartments to a position closing the other of said compartments, means for rotating said dump box from a normal position with its open end uppermost, means actuatable upon rotation of said dump box for moving said closure from closing relationship with one of said compartments to closing relationship with the other and vice versa, whereby different grades of molding material may be successively deposited on said pattern.

9. In shell molding apparatus, a rotatably supported dump box having one open end adapted to receive a pattern thereon, means in said compartment for separately supporting two charges of molding material of different grades, means for swinging said dump box about a horizontal axis from a normal position with said open end uppermost, means for closing alternatively one or the other of said compartments against outfall of material therefrom and actuatable upon rotation of said dump box to permit depositing by gravity one grade only of molding material on said pattern and for permitting removal of excess material therefrom by gravity upon return of said dump box to said normal position and actuatable upon rotation of said dump box for depositing by gravity the other grade only of said molding material on said pattern and for permitting removal of excess material therefrom by gravity upon return of said dump box to said normal position.

10. In the preparation of a shell mold from a pattern employing a dump box having a normal position with its open end uppermost and with a heated pattern received thereon, the steps of: segregating different grades of molding material in said dump box, swinging said dump box about a substantially horizontal axis to bring said pattern under said material and depositing one of said grades of molding material on said pattern by gravity subsequently returning said dump box to said normal position and permitting excess material to fall from said pattern by gravity, thereafter swinging said dump box about a substantially horizontal axis to bring said pattern under said material and depositing the other of said grades on said pattern by gravity and finally returning said dump box to said normal position and permitting excess material to fall from said pattern by gravity.

11. In shell molding apparatus, a rotatably supported dump box having a top and a bottom with said top open end and adapted to receive a pattern thereon closing said dump box, a horizontally extending support positioned between said top and bottom and adapted to receive one grade of molding material thereon with another grade of molding material received on said bottom, means for swinging said dump box about a horizontal axis to a position with said top lowermost, said support being floatingly supported in said dump box and adapted to remain horizontal upon so swinging said dump box whereby said other grade of molding material is deposited on said pattern by gravity, means actuatable upon returning said dump box to a position with said top uppermost for releasably securing said support to said dump box whereby said other grade is received on said support by gravity and said one grade is received on said bottom.

12. In shell molding apparatus, a rotatably supported dump box having one open end adapted to receive a pattern thereon and a pair of compartments communicating with said open end and adapted to contain different grades of molding material therein, a closure mounted in said dump box for movement from a position closing one of said compartments to a position closing the other of said compartments, means for rotating said dump box from a normal position with its open end uppermost, means actuatable upon rotation of said dump box for moving said closure from closing relationship with one of said compartments to closing relationship with the other and vice versa, whereby different grades of molding material may be successively deposited on said pattern, said closure comprising a gate reciprocably mounted in said dump box for movement generally parallel to the plane of said pattern.

13. Shell molding apparatus comprising a pair of spaced dump boxes for containing molding material and having corresponding open ends, each of said dump boxes being provided with a pattern support adapted to receive a pattern thereon, means hingedly securing said supports to said dump boxes respectively for swinging said patterns from closed positions extending across said open ends to open positions substantially 180 degrees therefrom, a curing oven positioned between said dump boxes and supported for moveemnt from a position in heat transmitting relationshp with the pattern on one of said supports when said one support is in open position to a position in heat transmitting relationship with the pattern on the other of said supports when the latter is in open position, means swingably supporting said dump boxes for movement through 180 degrees for depositing molding material on said patterns and means for so rotating said dump boxes, stripping means for removing the mold from said patterns and means supporting said stripping means for movement from a position in stripping relationship with the pattern in one of said supports to a position in stripping relationship with the pattern in the other of said supports, said stripping means being operatively connected with said oven for automatically moving the latter to a position in heat transfer relationship with one of said patterns when said stripping means is in stripping relationship with the other of said patterns and vice versa.

14. Shell molding apparatus comprising a pair of spaced dump boxes for containing molding material and having corresponding open ends, each of said dump boxes being provided with a pattern support adapted to receive a pattern thereon, means hingedly securing said supports to said dump boxes respectively for swinging said patterns from closed positions extending across said open ends to open positions substantially 180 degrees therefrom, a curing oven positioned between said dump boxes and supported for movement from a position in heat transmitting relationship with the pattern on one of said supports when said one support is in open position to a position in heat transmitting relationship with the pattern on the other of said supports when the latter is in open position, means swingably supporting said dump boxes for movement through 180 degrees for depositing molding material on said patterns and means for so rotating said dump boxes, stripping means for removing the mold from said patterns and means for supporting said stripping means for movement from a position in stripping relationship with the pattern in one of said supports to a position in stripping relationship with the pattern in the other of said supports, said stripping means including a member engageable with said pattern supports during stripping to prevent relative movement of said stripping means and said support away from each other, and means actuatable upon movement of said stripping means out of stripping relationship with said patterns for disconnecting said member from said pattern supports to permit swinging said supports away from said stripping means.

15. In shell molding apparatus, a dump box for containing molding material and having an open end, a pattern support hingedly secured to said dump box, and a first drive element for swinging said support from a closed position extending across said open end to an open position substantially 180 degrees therefrom, means swingably supporting said dump box for swinging the same through substantially 180° about an axis, a second drive element coaxial with said axis for so swinging said dump box, and means connecting said first and second drive elements whereby actuation of said second drive element in one direction swings said support from open to closed position and continued rotation of said second drive element in said one direction swings said dump box about said axis.

16. In shell molding apparatus, a dump box for containing molding material and having an open end, a pattern support hingedly secured to said dump box, and a first drive element for swinging said support from a closed position extending across said open end to an open position substantially 180 degrees therefrom, means swingably supporting said dump box for swinging the same through substantially 180° about an axis, a second drive element coaxial with said axis for so swinging said dump box, and means connecting said first and second drive elements whereby actuation of said second drive element in one direction swings said support from open to closed position and continued rotation of said first drive element in said one direction swings said dump box about said axis, said first and second drive elements comprising sprockets and said last mentioned means comprising a sprocket chain.

17. In shell molding apparatus a dump box for containing molding material and having an open upper end, a pattern support swingably mounted on said dump box for swinging from a closed position extending across said open end to an open position substantially 180 degrees therefrom, bearings supporting said dump box for swinging about an axis through substantially 180 degrees to an inverted position with said open end directed downwardly, a drive shaft coaxial with said bearings and means for rotating said shaft, driving means connecting said support and said shaft whereby rotation of said shaft in one direction swings said support from open to closed position and continued rotation of said drive shaft in said one direction swings said dump box to inverted position.

18. In shell molding apparatus a dump box for containing molding material and having an open upper end, a pattern support swingably mounted on said dump box for swinging from a closed position extending across said open end to an open position substantially 180 degrees therefrom, bearings supporting said dump box for swinging about an axis through substantially 180 degrees to an inverted position with said open end directed downwardly, a drive shaft coaxial with said bearings and means for rotating said shaft, driving means connecting said support and said shaft whereby rotation of said shaft in one direction swings said support from open to closed position and continued rotation of said drive shaft in said one direction swings said dump box to inverted position, said driving means including sprockets carried by said shaft and said support and a sprocket chain connecting said sprockets.

19. In shell molding apparatus, a dump box supported for swinging about an axis and having an open end normally directed upwardly and adapted to receive a pattern thereon, means dividing the interior of said dump box into two compartments for respectively receiving first and second grades of molding material therein, means for successively effecting communication between said compartments and said open end whereby said first and second grades of molding material may be successively deposited on said pattern upon successive inversions of said dump box.

20. In shell molding apparatus, a dump box supported for swinging about an axis and having an open end normally directed upwardly and adapted to receive a pattern thereon, means dividing the interior of said dump box into two compartments for respectively receiving first and second grades of molding material therein, means for successively effecting communication between said compartments and said open end whereby said first and second grades of molding material may be successively deposited on said pattern upon successive inversions of said dump box, said means comprising a support floatingly mounted in said dump box for supporting a charge of said first grade of molding material and baffles carried by said support and cooperating with a wall of said dump box for defining a compartment adapted to contain a charge of said second grade.

21. In shell molding apparatus, a dump box supported for swinging about an axis and having an open end normally directed upwardly and adapted to receive a pattern thereon, means dividing the interior of said dump box into two compartments for respectively receiving first and second grades of molding material therein, means for successively effecting communication between said compartments and said open end whereby said first and second grades of molding material may be successively deposited on said pattern upon successive inversions of said dump box, said dividing means, comprising a baffle stationarily secured in said dump box for so dividing the same into two compartments and said means for effecting communication with said open end comprising a closure movable from a position closing one of said compartments to a position closing the other of said compartments.

22. In shell molding apparatus, a dump box supported for swinging about an axis and having an open end normally directed upwardly and adapted to receive a pattern thereon, means dividing the interior of said dump box into two compartments for respectively receiving first and second grades of molding material therein, means for successively effecting communication between said compartments and said open end whereby said first and second grades of molding material may be successively deposited on said pattern upon successive inversions of said dump box, said dividing means comprising a baffle stationarily secured in said dump box for so dividing the same into two compartments and said means for effecting communication with said open end comprising a gate swingably supported within said dump box for swinging movement from a position in closing relationship with one of said compartments to a position in closing relationship with the other of said compartments.

23. In shell molding apparatus, a dump box supported for swinging about an axis and having an open end normally directed upwardly and adapted to receive a pattern thereon and a bottom opposite said open end, a baffle stationarily secured in said dump box and extending from said bottom towards said open end dividing said dump box into two compartments having discharge ends opening toward said open end of said dump box, and respectively adapted to contain charges of different grades of molding material, a pivoted baffle mounted adjacent said baffle for swinging from a position closing the discharge end of one of said compartments to a position closing the discharge end of the other of said compartments, means for successively swinging said baffle to said positions whereby said different grades of molding material may be successively deposited on said pattern upon successive inversions of said dump box.

24. A mold forming machine comprising a frame, a first shaft journaled in said frame, an open-top hopper for molding material mounted on said shaft for rotation therewith, a second shaft rotatably mounted on the upper portion of said hopper, a pattern plate-holding frame mounted on said second shaft for movement between inoperative or outward position and operative disposition upon the open-top of said hopper to present a pattern plate carried thereby in confronting relation to the molding material, and drive means connecting said first and second shafts whereby upon rotation of said first shaft said pattern plate-holding frame will first be swung into operative position and then the same and the hopper will be rotated as a unit into inverted position wherein mold material will fall coveringly upon the pattern plate.

References Cited in the file of this patent

UNITED STATES PATENTS

| | | |
|---|---|---|
| 778,329 | Pipher | Dec. 27, 1904 |
| 2,626,053 | McIlvaine | Jan. 20, 1953 |
| 2,724,158 | Davis et al. | Nov. 22, 1955 |
| 2,762,092 | Klamp et al. | Sept. 11, 1956 |
| 2,798,265 | Rubovitz et al. | July 9, 1957 |

FOREIGN PATENTS

| | | |
|---|---|---|
| 832,936 | Germany | Mar. 3, 1952 |

OTHER REFERENCES

The Iron Age, May 15, 1952, pages 109–113.
Fortune, July 1952, pages 104–106, 140 and 143.
Am. Foundryman, August 1952, pages 42–46.
Foundry, September 1952, pages 95–97, 108–111.